United States Patent
Singh et al.

(10) Patent No.: US 10,542,086 B2
(45) Date of Patent: Jan. 21, 2020

(54) DYNAMIC FLOW CONTROL FOR STREAM PROCESSING

(71) Applicant: General Electric Company, Schenectady, NY (US)

(72) Inventors: Ardaman Singh, San Ramon, CA (US); Arvind Singh, San Ramon, CA (US)

(73) Assignee: General Electric Company, Schenectady, NY (US)

( * ) Notice: Subject to any disclaimer, the term of this patent is extended or adjusted under 35 U.S.C. 154(b) by 179 days.

(21) Appl. No.: 15/796,962

(22) Filed: Oct. 30, 2017

(65) Prior Publication Data
US 2019/0132387 A1  May 2, 2019

(51) Int. Cl.
*G06F 15/16*    (2006.01)
*H04L 29/08*    (2006.01)
*G06F 16/2455*  (2019.01)

(52) U.S. Cl.
CPC .... *H04L 67/1095* (2013.01); *G06F 16/24568* (2019.01); *H04L 67/12* (2013.01)

(58) Field of Classification Search
CPC .......... G06Q 20/00; G06N 3/02; G06N 5/046; H04L 67/12; H04L 1/0002; H04L 5/0064; H04L 67/1097; H04L 1/0041; H04L 1/18; H04L 67/10; G06K 9/6263
See application file for complete search history.

(56) References Cited

U.S. PATENT DOCUMENTS

| | | | | |
|---|---|---|---|---|
| 2013/0182573 | A1* | 7/2013 | Soppera | H04L 47/10 370/235 |
| 2014/0089459 | A1* | 3/2014 | Werr | H04L 67/06 709/217 |
| 2014/0328172 | A1* | 11/2014 | Kumar | H04L 47/18 370/231 |
| 2015/0160887 | A1* | 6/2015 | Beeson | G06F 3/0659 711/154 |
| 2018/0024766 | A1* | 1/2018 | Agetsuma | G06F 13/10 711/154 |

* cited by examiner

*Primary Examiner* — Michael A Keller
*Assistant Examiner* — Thao D Duong
(74) *Attorney, Agent, or Firm* — Buckley, Maschoff & Talwalkar, LLC

(57) ABSTRACT

The example embodiments are directed to a system and method for dynamically controlling a flow of a stream processing application. The method may include executing the application which reads data from a data source and writes data to a target destination, and which includes a pipeline of operators which perform different operations on the data, determining a runtime performance of the pipeline of operators included in the stream processing application, and dynamically synchronizing the runtime performance of each of the operators in the pipeline of operators of the stream processing application by changing a processing speed of at least one operator. By changing the speed of the at least one operator a performance of all operators can be synchronized to accommodate dynamic characteristics of the processing environment such as target database conditions, operator processing performance, and the like, which can change during runtime.

15 Claims, 5 Drawing Sheets

FIG. 3
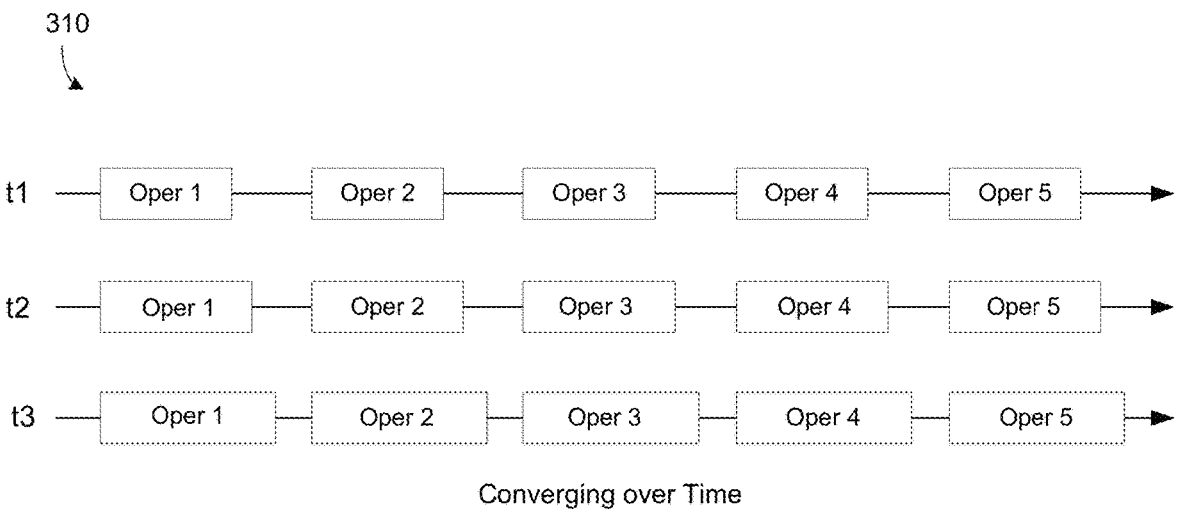
Converging over Time
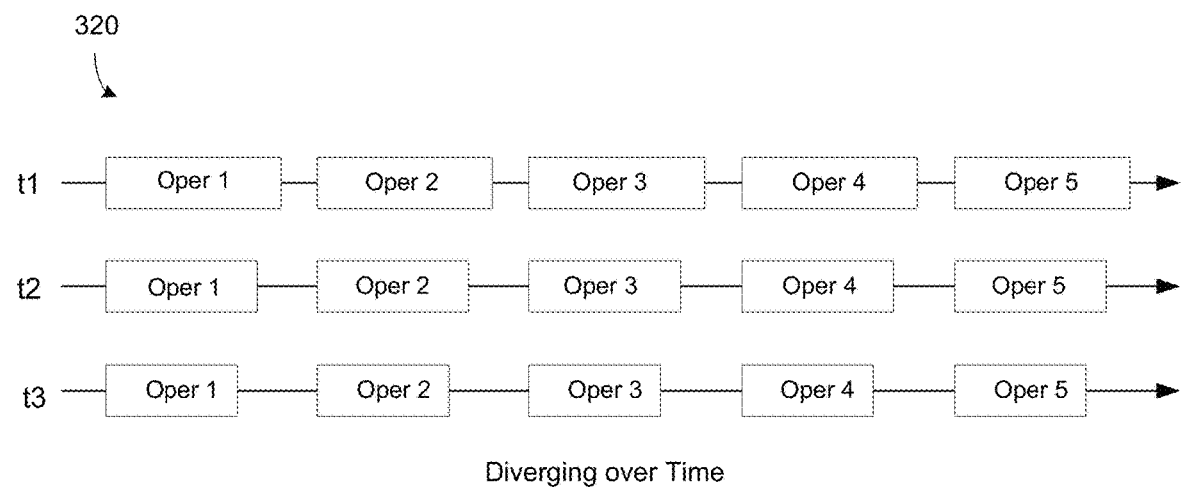
Diverging over Time

DYNAMIC FLOW CONTROL FOR STREAM PROCESSING

BACKGROUND

Machine and equipment assets are engineered to perform particular tasks as part of a process. For example, assets can include, among other things and without limitation, industrial manufacturing equipment on a production line, drilling equipment for use in mining operations, wind turbines that generate electricity on a wind farm, transportation vehicles, gas and oil refining equipment, and the like. As another example, assets may include devices that aid in diagnosing patients such as imaging devices (e.g., X-ray or MM systems), monitoring equipment, and the like. The design and implementation of these assets often takes into account both the physics of the task at hand, as well as the environment in which such assets are configured to operate.

Low-level software and hardware-based controllers have long been used to drive machine and equipment assets. However, the rise of inexpensive cloud computing, increasing sensor capabilities, and decreasing sensor costs, as well as the proliferation of mobile technologies, have created opportunities for creating novel industrial and healthcare based assets with improved sensing technology and which are capable of transmitting data that can then be distributed throughout a network. As a consequence, there are new opportunities to enhance the business value of some assets through the use of novel industrial-focused hardware and software.

Industrial manufacturing-based systems generate and store a significant amount of data on a continuous basis. For example, edge devices (equipment, machines, etc.) may repeatedly feedback data to a central cloud platform or other host environment over the course of a short period of time (e.g., seconds, minutes, hours, etc.) Before the raw data can be consumed by other systems and software, the data is processed, converted, and stored in an appropriate location for further consumption. Stream processing may be used to transfer large amounts of data from a data source such as the edge of an industrial environment to a target destination such as a host platform. Stream processing provides high-velocity and high-volume data transfer with very little latency.

A stream processing application typically includes a plurality of operators which each perform a processing event on an input stream and output the processed stream. A first operator may be used to read the source data while the last operator in the pipeline may write the processed data to the target destination. In addition, one or more intermediate operators can perform additional functions on the data as it is transferred from the data source to the target destination. However, if a processing speed of an operator lags behind the processing speed of other operators, a bottleneck may be created within the pipeline leading to inefficient stream processing. On the other hand, if data is entering the pipeline to fast, the entire stream processing application can shut down. However, situations which influence processing speed can be unexpected and difficult to predict. Therefore, a technology is needed which can adapt to dynamic changes in the flow of data between operators in a stream processing application.

SUMMARY

The example embodiments improve upon the prior art by providing a system which monitors runtime characteristics of a stream processing application during execution and dynamically changes a flow of data between operators within a pipeline of operators included in the stream processing application to thereby dynamically control an overall flow of stream data in the pipeline. The system may implement various upper and/or lower limits associated with the operators, the data source, the target destination, and the like, and dynamically control an input speed or an output speed of at least one of the operators to synchronize a speed of all operators in the pipeline. The stream processing application may be used to transfer large volumes of data and to perform different processing operations on the data as it is transferred. In some embodiments, the stream processing application may be incorporated within a cloud computing environment of an Industrial Internet of Things (IIoT).

According to an aspect of an example embodiment, a method includes one or more of executing a stream processing application which reads data from a data source and writes the data to a target destination, the stream processing application comprising a pipeline of operators which perform different processing operations on the data, determining a runtime performance of the pipeline of operators included in the stream processing application, and dynamically synchronizing the runtime performance of each of the operators in the pipeline of operators of the stream processing application by changing a processing speed of at least one operator.

According to an aspect of another example embodiment, a computing system includes one or more of a memory configured to store program instructions, and a processor configured to execute the program instructions, wherein, when executed, the program instructions cause the processor to execute a stream processing application which reads data from a data source and writes the data to a target destination, the stream processing application comprising a pipeline of operators which perform different processing operations on the data, determine a runtime performance of the pipeline of operators included in the stream processing application, and dynamically synchronize the runtime performance of each of the operators in the pipeline of operators of the stream processing application by changing a processing speed of at least one operator.

Other features and aspects may be apparent from the following detailed description taken in conjunction with the drawings and the claims.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 3 is a diagram illustrating a graph in which operator performance is modeled as intervals of time in accordance with example embodiments.

Figure 1:
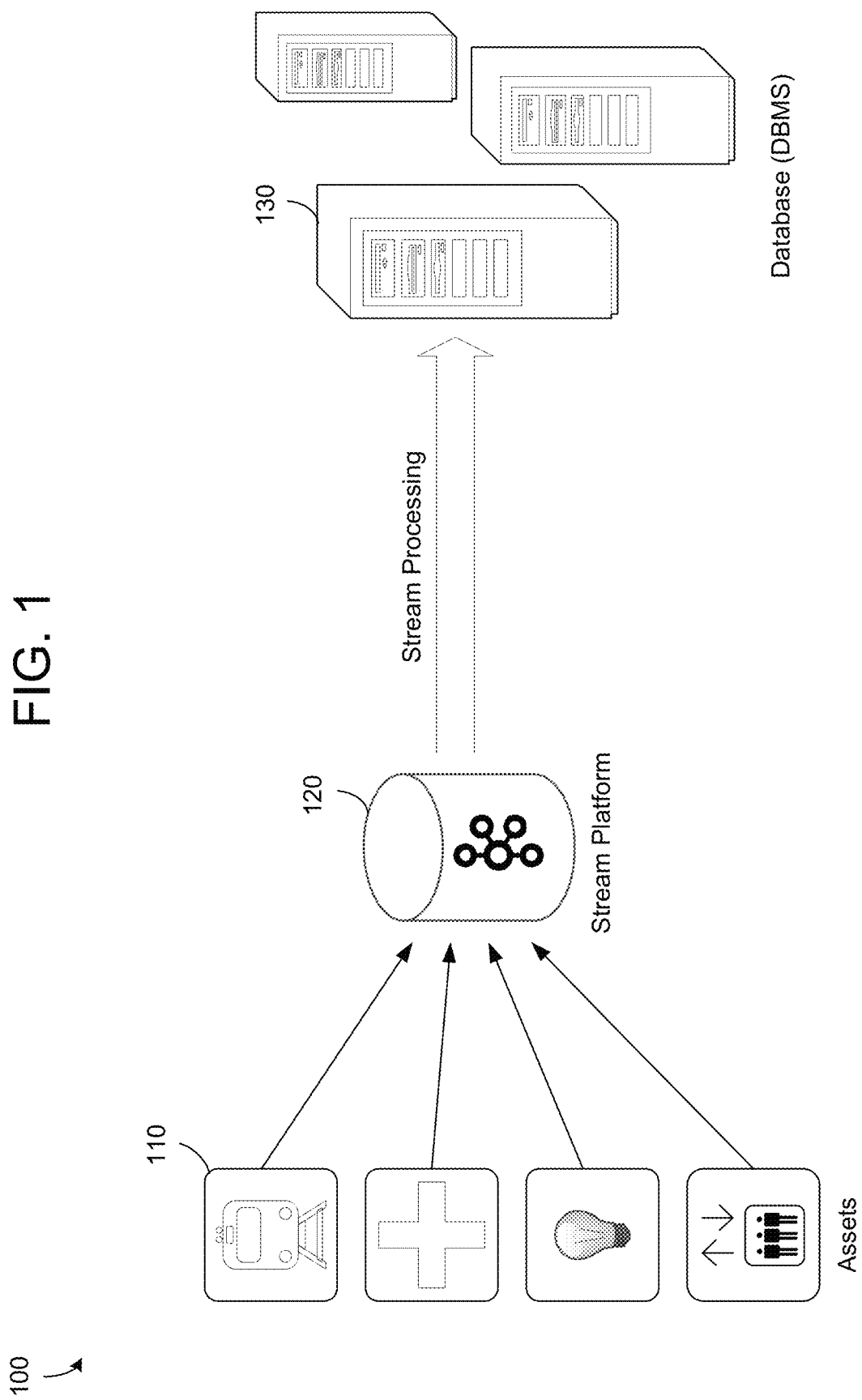
FIG. 1 is a diagram illustrating a stream processing application for transferring data from a source to a target in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation.

However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The example embodiments are directed to a system and method for adaptively controlling a flow of data within a stream processing application during runtime. A runtime environment where the stream processing application is being performed may be effected by characteristics that are unique to that specific runtime operation (e.g., other programs, write speed to the destination database, operating environment, etc.) For example, a processing speed of one operator or more than one operator may be controlled (i.e., sped up or slowed down) to synchronize the processing speed of all operators in a pipeline within the stream processing application. By controlling the speed of operators based on the overall pipeline, the system described herein can prevent the pipeline from lagging behind and leading to a bottleneck of data at various operators and can also prevent the pipeline from operating too fast and causing a shutdown or a power failure of the entire stream processing application. Furthermore, the system operates on the pipeline during runtime of the data stream processing application rather than based on predefined or static rules set ahead of time. As a result, the system can adapt dynamically to changes in operating characteristics of a data source, a target destination, and within the pipeline itself.

Typically, a flow of data within a stream processing application is predefined by parameters of the application. These parameters are set prior to the steam processing application being executed. However, because these parameters are predefined, the stream processing application is not able to address or handle issues that can arise during runtime such as excessive write requests to a target destination, a processing speed of the data source or the target destination, a partition to which the data is being written, and the like. As a result, the stream processing application is unable to synchronize operators when they begin to run out of sync. The example embodiments provide a system capable of monitoring the overall performance of a pipeline of operators during runtime and addressing issues dynamically. The system can speed up or slow down an operator within the pipeline to thereby synchronize a processing speed of all operators in the pipeline.

The system for controlling a stream processing application may be implemented within the application or implemented separately via a program or other software the communicates with the stream processing application. The system may be used in conjunction with applications for managing machine and equipment assets and can be hosted within an Industrial Internet of Things (IIoT). In an example, an IIoT connects assets, such as turbines, jet engines, locomotives, elevators, healthcare devices, mining equipment, oil and gas refineries, and the like, to the Internet or cloud, or to each other in some meaningful way such as through one or more networks. The software program described herein can be implemented within a "cloud" or remote or distributed computing resource. The cloud can be used to receive, relay, transmit, store, analyze, or otherwise process information for or about assets and manufacturing sites. In an example, a cloud computing system includes at least one processor circuit, at least one database, and a plurality of users or assets that are in data communication with the cloud computing system. The cloud computing system can further include or can be coupled with one or more other processor circuits or modules configured to perform a specific task, such as to perform tasks related to asset maintenance, analytics, data storage, security, or some other function.

Stream processing relies on a stream of data that is read from a source and that is typically stored or written into a destination. The stream processing occurs between the source and the destination. Within a stream processing application, a group of operators usually within a pipeline process the streams of data. The operators are the fundamental logical building blocks of stream processing. An operator may process incoming streams of data and produce output streams as a result. The operators typically include a source operator for reading and creating a stream of data from an external data source that can be consumed by downstream operators. The operators also typically include a sink operator which writes data from the input streams to an external data system. Between the source operator and the sink operator typically exist one or more intermediate operators for performing built-in operations on the data streams such as data conversion, error check, and the like.

FIG. 1 illustrates a system 100 that includes a stream processing application for transferring data from a source to a target in accordance with an example embodiment. Referring to FIG. 1, the system 100 includes a plurality of assets 110 which may be included within an Industrial Internet of Things (IIoT) and which may transmit raw data to a source such as stream platform 120 where it may be stored. The data stored at the stream platform 120 or passing through the stream platform 120 may be transferred to a target destination such as database 130. The transfer may be performed by one or more stream processing applications that include a pipeline of operators performing data processing operations on the streaming data as it is transferred from the stream platform 120 to the database 130. It should also be appreciated that the stream platform 120 and the database 130 are not limited to a streaming platform and a database, as this is merely shown for purposes of example. The example embodiments can work with any source data (e.g., database, file, server, etc.) and any target destination (e.g., database, file, server, etc.)

In this example, the system 100 may be associated with an Industrial Internet of Things (IIoT). For example, an asset management platform (AMP) can reside in cloud computing system which may be included or coupled to database 130, in a local or sandboxed environment, or can be distributed across multiple locations or devices and can be used to interact with assets (not shown). The AMP can be configured to perform functions such as data acquisition, data analysis, data exchange, and the like, with local or remote assets 110, or with other task-specific processing devices. For example, the assets 110 may be an asset community (e.g., turbines, healthcare, power, industrial, manufacturing, mining, oil and gas, elevator, etc.) which may be communicatively coupled to the database 130 via one or more intermediate devices such as stream platform 120. The stream processing application may be included within the stream platform 120, the database 130, or a combination thereof. Also, the controlling of the stream processing application may be performed by a program that is included within the stream platform, the database 130, or a combination thereof.

Information from the assets 110 may be communicated to the database 130 via the stream platform 120. In an example, external sensors can be used to sense information about a function of an asset, or to sense information about an environment condition at or near an asset, a worker, a downtime, a machine or equipment maintenance, and the like. The external sensor can be configured for data communication with the stream platform 120 which can be configured to store the raw sensor information and transfer the raw sensor information over a network to the database 130 where it can be accessed by users, applications, systems, and the like for further processing. Furthermore, an operation of the assets 110 may be enhanced or otherwise controlled by a user inputting commands though an application hosted by the database 130 or other remote host platform such as a web server or cloud computing environment which is coupled to or included within the database 130. The data provided from the assets 110 may include time-series data or other types of data associated with the operations being performed.

In some embodiments, the database 130 may include a local, system, enterprise, or global computing infrastructure that can be optimized for industrial data workloads, secure data communication, and compliance with regulatory requirements. The database may include a database management system (DBMS) for creating, monitoring, and controlling access to data in the database 130. The database 130 can also include services that developers can use to build or test industrial or manufacturing-based applications and services to implement IIoT applications that interact with output data from the slicing and merging software described herein. For example, a cloud computing system implemented within or coupled to the database 130 may host a microservices marketplace where developers can publish their distinct services and/or retrieve services from third parties. In addition, the cloud computing system can host a development framework for communicating with various available services or modules. The development framework can offer distinct developers a consistent contextual user experience in web or mobile applications. Developers can add and make accessible their applications (services, data, analytics, etc.) via the cloud computing system. Analytics are capable of analyzing data from or about a manufacturing process and provide insight, predictions, and early warning fault detection.

Figure 2:
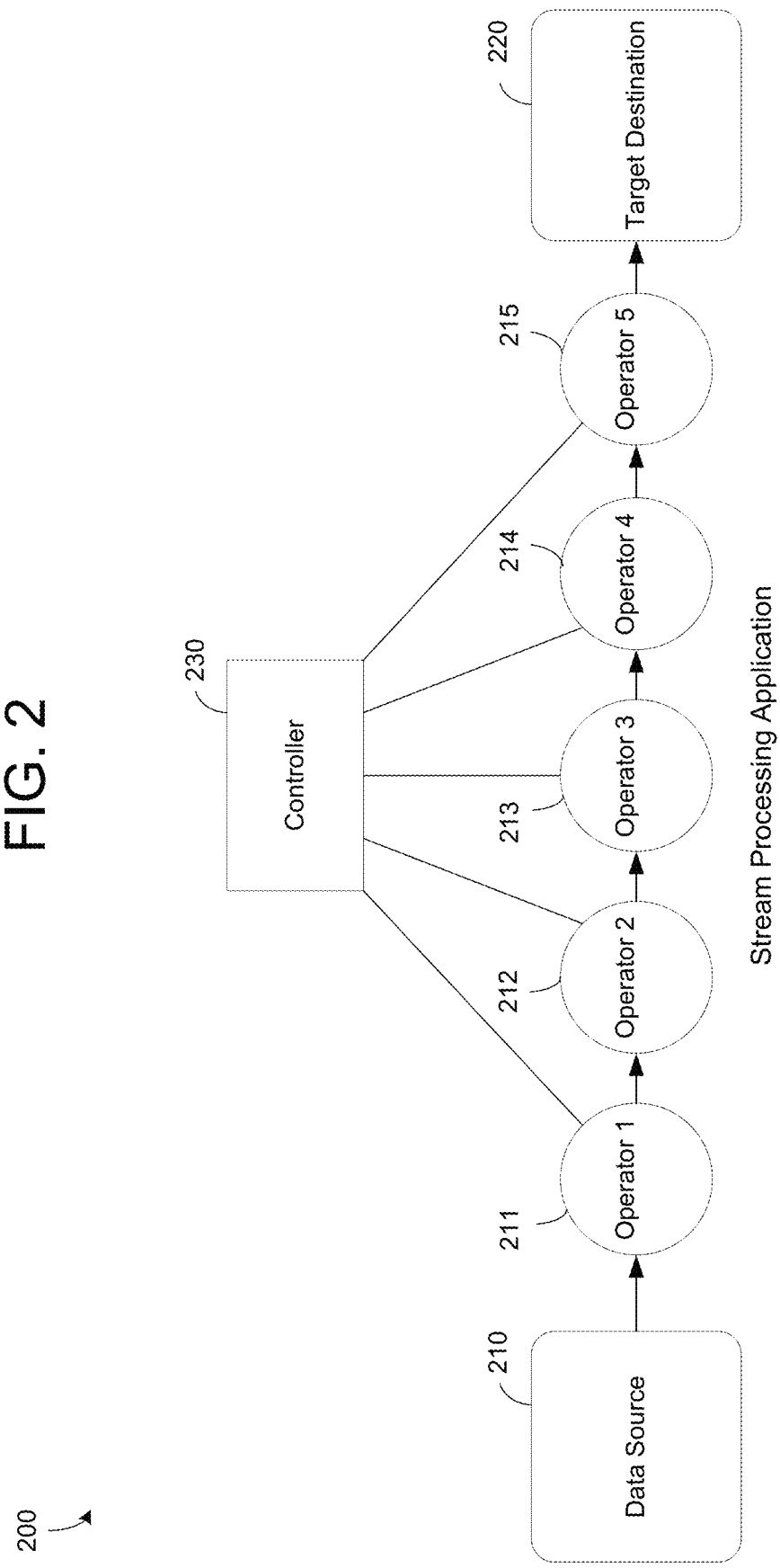
FIG. 2 is a diagram illustrating a process of controlling a flow in a stream processing application in accordance with an example embodiment.

FIG. 2 illustrates a process 200 of controlling a flow in a stream processing application in accordance with an example embodiment. In this example, the process 200 includes an executing stream processing application which is composed of a plurality of operators 211-215 which perform processing operations on data as it is transferred from data source 210 to target destination 220. The data source 210 and the target destination 220 may be the stream platform 120 and the database 130 shown in FIG. 1, however, the embodiments are not limited thereto. Data may be transferred from the data source 210 to the target destination 220 via the pipeline of operators 211-215. Here, the data may be transferred in the form of a high-velocity and high-volume stream thereby moving the data quickly. The data source 210 may be a large source of data (e.g., database, file, etc.)

The operators 211-215 may perform various processing operations on data in a series of steps as data is transferred from the data source 210 to the target destination 220 over a network such as the Internet, private network, or a combination thereof. For example, operator 211 may perform a first process such as reading data from the data source 210. Meanwhile, operator 215 may perform a final process such as writing data processed by the pipeline of operators 211-215 to the target destination 220. The plurality of intermediate operators 212-214 may perform different processing operations on the data as it is read from the source 210. Here, input of each operator may be connected to an output of a previous operator. For example, operator 212 may receive data read by the source operator 211 and examine the streaming data to determine if the data is compressed. If so, the operator 212 may decompress the streaming data. The operator 213 may receive the decompress stream of data from operator 212 and parse the decompressed data. Furthermore, the operator 213 may check the attributes of the data to ensure that the data is compatible with the target destination 220. The operator 214 may receive the error-checked data from operator 213 and convert the data into data points which are the units of storage recognized by the target destination 220. Furthermore, the operator 215 may receive the converted data from operator 214 and write the data to the target destination 220.

At runtime, the operators 211-215 may have a performance that varies between expected speeds, slower than expected speeds, and faster than expected speeds. According to various embodiments, controller 230 may monitor the flow of data as it progresses from the data source 210, through the pipeline of operators 211-215, to the target destination 220, and dynamically adjust the operating speed of one or more operators to ensure that the operators 211-215 as a whole are operating in sync. The controller 230 may be a program or application that communicates with the stream processing application, or the controller 230 may be implemented within the stream processing application.

The controller 230 may monitor the overall pipeline and when the pipeline is working within a predefined minimum and maximum threshold, the controller 230 may leave the pipeline alone. When the pipeline of operators 211-215 begins to slow down such that the data coming in is below a minimum threshold, the controller 230 may speed up at least one operator to speed up the entire pipeline. Likewise, when the pipeline of operators 211-215 begins to operate above a maximum threshold, the controller 230 may slow down at least one operator from the pipeline to slow down the speed of the entire pipeline. The controller 230 may continuously adjust the speed (up or down) to improve the synchronization between the operators 211-215 and ensure that the pipeline is operating at its most efficient speed without entering the maximum threshold. That is, the controller 230 may dynamically control the flow of data through the pipeline of operators 211-215 at runtime based on an optimum speed determined at that specific runtime. As the performance changes, the controller 230 can change the flow dynamically without having to restart or reconfigure the stream processing application. In order to speed up or slow down an operator, the controller 230 may dynamically adjust the rate of speed and/or the amount of data that the operator consumes. The rate of speed and the amount of data may be preset when the application launches and may be dynamically adjusted or configured by the controller 230 during runtime.

The operators 211-215 may be adjusted by various methods, examples of which are further described herein. FIG. 3 illustrates an example of modeling operators as intervals of time with respect to one another. Here, each operator may be modeled as a unit of time such as an average processing time of the operator performing a specific logic or operation, or the like. In this example, process 310 illustrates the operators having processing times that converge (i.e., move closer to one another.) Meanwhile, process 320 illustrates the operators having processing times that diverge (i.e., move away from one another). In this example, the controller 230 may dynamically determine if the windows of time are diverging or converging. For example, the controller 230 may slow down the flow if the windows start diverging, keep same speed if window difference remain same, start speeding up if the windows don't diverge further, and the like. Also, the controller 230 may make periodic updates the control of the flow. For example, for every five minutes of time, the controller 230 may keep track of the windows difference in the beginning and end of the interval and apply the speed up or slowdown based on whether windows are diverging or converging. All these numbers and ratios can be pre-configured and can be also changed at the runtime.

As another example, the controller 230 may slow down or speed up the flow based on the number of pending database write requests for the target destination 220. For example, a pre-configured upper and ideal limit of the pending writes may be set based on the number of nodes, storage used, network bandwidth, memory, processor speed, database schema of the database cluster, and the like. This number can be potentially computed from testing. When the number of number of pending writes exceed the max limit, the controller 230 may start slowing down based on the number by which pending writes are exceeding the max limit. As long the number of pending writes are within the ideal limit, the controller 230 may keep speeding up until the max configured limit is reached. All these numbers and ratios can be pre-configured and can be also changed at the runtime.

As another example, the controller 230 may slow down or speed up the flow based on the median speed of the database writes to the target destination 220. For example, a pre-configured upper and ideal number for the median write speed may be set based on the number of nodes, storage used, network bandwidth, memory, processor speed, database schema of the database cluster. All these numbers and ratios can be pre-configured and can be changed at the runtime. The controller 230 may use any or all of the average, median, max, or a percentile such as 50%, 60%, 75%, 90%, etc., write speed to determine when to speed up or slowdown.

As another example, the controller 230 may slow down or speed up the input flow based on the speed of the target partition/table being written to in the target destination 220. Within a database, the write speed can vary based on the target data partition. This method keeps track of the historical write speed of the target partition and slows down or speeds up the input based on the data partition it is destined for.

As another example, the controller 230 may slow down or speed up the input flow based on the current load of the target destination 220. The controller 230 may use a combination of number of compactions pending, median read and write speed, number of pending read/write requests, number of native clients, memory used to determine the load, and the like, to determine the load. When the load is under the ideal load, the controller 230 may speed up input. When the load is above the ideal load, the controller 230 may start slowing down the input flow. The controller 230 may compute the slow down based on the difference between the current load and the ideal load.

As another example, the controller 230 may use time-based scheduled input control. For example, the controller 230 may configure the system to be primarily used for reading during regular business hours and slow down write during that time to keep system free for better read performance. Speed up the writes during non-business hours as the system is not likely used for active reading or analysis.

As another example, the controller 230 may dynamically vary the write speed to the target destination 220 based on the current number of read requests for the target destination 220. For example, the controller 230 may vary the write speed when the number of read requests to the target destination 220 increases above the pre-configured threshold (computed on the number of nodes, storage used, network bandwidth, memory, processor speed, database schema of the database cluster. This number can be potentially computed from testing.), start slowing down writes. As another example, when the number of read operations is under the pre-computed threshold, the controller 230 may start speeding up writes.

Figure 4:
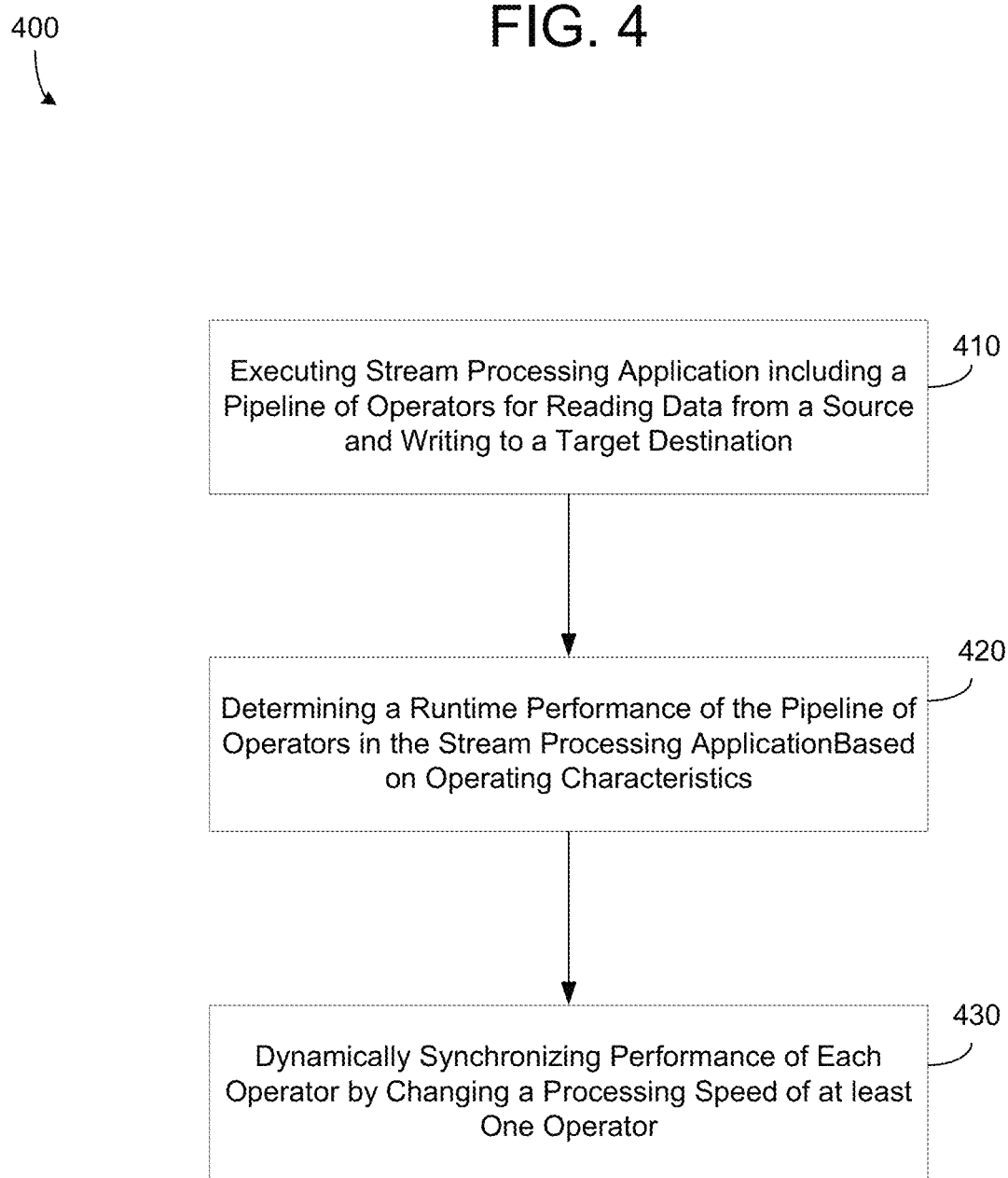
FIG. 4 is a diagram illustrating a method for dynamically controlling a stream processing application in accordance with an example embodiment.

FIG. 4 illustrates a method 400 for dynamically controlling a stream processing application in accordance with an example embodiment. For example, the method 400 may be performed by the stream platform 120 and/or the database 130 shown in the system 100 of FIG. 1, or another device or group of devices. Referring to FIG. 4, in 410, the method includes executing a stream processing application which reads data from a data source and writes the data to a target destination. According to various aspects, the stream processing application may include a pipeline of operators (e.g., two or more operators) which perform different processing operations on the data. Examples of processing operations being performed by an operator include reading source data, decompressing/compressing data, parsing data, attribute checking data, transforming data, writing data to a destination, and the like. For example, the pipeline of operators may include at least a source operator for reading data from the data source, a sink operator for writing data to the target destination, and at least one intermediate operator for performing conversion of the streaming data between the source and sink operators.

In 420, the method includes determining a runtime performance of the pipeline of operators included in the stream processing application, and in 430, dynamically synchronizing the runtime performance of each of the operators in the pipeline of operators by changing a processing speed of at least one operator. For example, in 420 the method may determine that the runtime performance of the stream processing application is above an upper limit and the dynamically synchronizing in 430 may include slowing down an operator from among the pipeline of operators. As another example, in 420 the method may include determining the runtime performance of the stream processing application is below a lower limit and the dynamically synchronizing in 430 may include speeding up an operator from among the pipeline of operators. In some embodiments, the dynamically synchronizing may include dynamically changing a speed of a source operator from among the pipeline of operators to change a speed at which data is read into the pipeline. As another example, a different operator other than the source operator may be changed based on the speed of the operators within the pipeline.

The overall flow of the operators may be monitored and dynamically changed based on different triggering mechanisms. For example, the determining may include modeling the operators as windows of time, and the dynamically changing may include, in response to windows of time corresponding to the operators converging with respect to each other, slowing down the processing speed of the at least one operator, and in response to the windows of time corresponding to the operators diverging with respect to each other, speeding up the processing speed of the at least one operator. As another example, the determining may include determining a number of write requests pending for the target destination, and the dynamically synchronizing may include, in response to the pending write requests exceeding a predetermined upper limit, slowing down the processing speed of the at least one operator, and in response to the pending write requests being below a predetermined lower limit, speeding up the processing speed of the at least one operator.

As another example, the determining may include determining an average speed of the data stream processing application processing a write request from the data source to the target destination, and the dynamically synchronizing may include, in response to the average speed exceeding a predetermined upper limit, slowing down the processing speed of the at least one operator, and in response to the average speed being below a predetermined lower limit, speeding up the processing speed of the at least one operator. As another example, the determining may include determining a current load of the target destination, and the dynamically synchronizing may include, in response to the current load exceeding a predetermined upper limit, slowing down the processing speed of the at least one operator, and in response to the current load being below a predetermined lower limit, speeding up the processing speed of the at least one operator. As another example, the determining may include determining a current speed of a target table within the target destination, and the dynamically synchronizing may include, in response to the current speed of the target table exceeding a predetermined upper limit, slowing down the processing speed of the at least one operator, and in response to the current speed of the target table being below a predetermined lower limit, speeding up the processing speed of the at least one operator.

Figure 5:
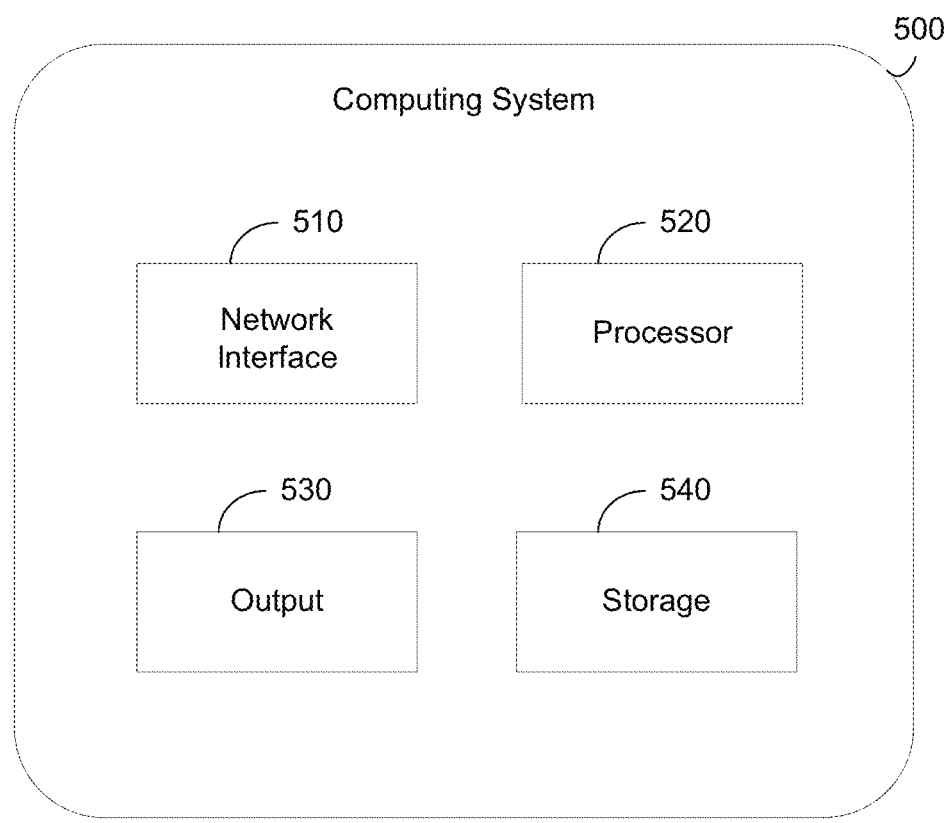
FIG. 5 is a diagram illustrating a computing system for dynamically controlling a stream processing application in accordance with an example embodiment.

FIG. 5 illustrates a computing system 500 for dynamically controlling a stream processing application in accordance with an example embodiment. For example, the computing system 500 may be a database, cloud platform, streaming platform, and the like. In some embodiments, the computing system 500 may be distributed across multiple devices. Also, the computing system 500 may perform the method 400 of FIG. 4. Referring to FIG. 5, the computing system 500 includes a network interface 510, a processor 520, an output 530, and a storage device 540 such as a memory. Although not shown in FIG. 5, the computing system 500 may include other components such as a display, an input unit, a receiver, a transmitter, and the like.

The network interface 510 may transmit and receive data over a network such as the Internet, a private network, a public network, and the like. The network interface 510 may be a wireless interface, a wired interface, or a combination thereof. The processor 520 may include one or more processing devices each including one or more processing cores. In some examples, the processor 520 is a multicore processor or a plurality of multicore processors. Also, the processor 520 may be fixed or it may be reconfigurable. The output 530 may output data to an embedded display of the computing system 500, an externally connected display, a display connected to the cloud, another device, and the like. The storage device 540 is not limited to a particular storage device and may include any known memory device such as RAM, ROM, hard disk, and the like, and may or may not be included within the cloud environment. The storage 540 may store software modules or other instructions which can be executed by the processor 520 to perform the method 400 shown in FIG. 4.

According to various embodiments, the processor 520 may execute a stream processing application which reads data from a data source and writes the data to a target destination. The stream processing application may include a pipeline of operators which perform different processing operations on the data. The processor 520 may determine a runtime performance of the pipeline of operators included in the stream processing application. The runtime performance may indicate if any of the operators are lagging behind or if any of the operators are running faster than expected. For example, the runtime performance may indicate if an operator is processing at a speed that is faster than a predetermined upper limit or is processing at a speed that is slower than a predetermined lower limit. The processor 520 may further dynamically synchronize the runtime performance of each of the operators in the pipeline of operators of the stream processing application by changing a processing speed of at least one operator.

The pipeline of operators may be included within a stream processing application that reads data from the source and writes the data to a destination databases. The operators may include a source operator for reading data from the data source, a sink operator for writing data to the target destination, and at least one intermediate operator for performing conversion of the streaming data between the source and sink operators. In some embodiments, the processor 520 may control the source operator in order to control a speed of all operators by limiting or increasing the amount and/or the speed at which streaming data is being read into the pipeline. As another example, the processor 520 may change a speed of another operator that is further down the pipeline if it determines that the operator is causing the overall pipeline to be out of sync. As another example, the processor 520 may change a processing speed of one or more operators based on operating characteristics of the target destination database (e.g., number of pending write requests, average speed of write request processing, target partition within the database, current load, and the like).

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet, cloud storage, the internet of things, or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computer-implemented method comprising:
executing a stream processing application which reads data from a data source and writes the data to a target destination, the stream processing application comprising a pipeline of operators which perform different processing operations on the data;
determining that a runtime processing speed of at least two operators among the pipeline of operators included in the stream processing application are out of sync with respect to each other;
determining an average speed of the data stream processing application processing a write request from the data source to the target destination; and
dynamically synchronizing the runtime processing speed of the at least two out of sync operators in the pipeline of operators of the stream processing application by changing a processing speed of at least one operator based on an overall processing performance of the stream processing application as a whole,
wherein the dynamically synchronizing comprises, in response to the average speed exceeding a predetermined upper limit, slowing down the processing speed of the at least one operator, and in response to the average speed being below a predetermined lower limit, speeding up the processing speed of the at least one operator.

2. The computer-implemented method of claim 1, wherein the pipeline of operators include a source operator for reading data from the data source, a sink operator for writing data to the target destination, and at least one intermediate operator for performing conversion of the streaming data between the source and sink operators.

3. The computer-implemented method of claim 1, wherein the dynamically synchronizing comprises dynamically changing a speed of a source operator from among the pipeline of operators to change a speed at which data is read into the pipeline.

4. The computer-implemented method of claim 1, wherein the determining comprises modeling the operators as windows of time, and
the dynamically changing comprises, in response to windows of time corresponding to the operators coming closer to each other over time, slowing down the processing speed of the at least one operator, and in response to the windows of time corresponding to the operators getting farther apart from each other over time, speeding up the processing speed of the at least one operator.

5. The computer-implemented method of claim 1, wherein the determining further comprises determining a number of write requests pending for the target destination, and
the dynamically synchronizing is further performed based on the number of pending write requests for the target destination.

6. The computer-implemented method of claim 1, wherein the determining further comprises determining a current load of the target destination, and
the dynamically synchronizing is further performed based on the current load of the target destination.

7. The computer-implemented method of claim 1, wherein the determining further comprises determining a current speed of a target table within the target destination, and
the dynamically synchronizing is further performed based on the current speed of the target.

8. A computing system comprising:
a memory configured to store program instructions; and
a processor configured to execute the program instructions, wherein, when executed, the program instructions cause the processor to
execute a stream processing application which reads data from a data source and writes the data to a target destination, the stream processing application comprising a pipeline of operators which perform different processing operations on the data,
determine that a runtime processing speed of at least two operators among the pipeline of operators included in the stream processing application are out of sync with respect to each other,
determining an average speed of the data stream processing application processing a write request from the data source to the target destination, and
dynamically synchronize the runtime processing speed of the at least two out of sync operators in the pipeline of operators of the stream processing application by changing a processing speed of at least one operator based on an overall processing performance of the stream processing application as a whole,
wherein the dynamically synchronizing comprises, in response to the average speed exceeding a predetermined upper limit, slowing down the processing speed of the at least one operator, and in response to the average speed being below a predetermined lower limit, speeding up the processing speed of the at least one operator.

9. The computing system of claim 8, wherein the pipeline of operators include a source operator for reading data from the data source, a sink operator for writing data to the target destination, and at least one intermediate operator for performing conversion of the streaming data between the source and sink operators.

10. The computing system of claim 8, wherein the processor dynamically changes a speed of a source operator from among the pipeline of operators to change a speed at which data is read into the pipeline of operators.

11. The computing system of claim 8, wherein the processor models the operators as windows of time, and in response to windows of time corresponding to the operators coming closer to each other over time, slows down the processing speed of the at least one operator, and in response to the windows of time corresponding to the operators getting farther apart from each other over time, speeds up the processing speed of the at least one operator.

12. The computing system of claim 8, wherein the processor determines a number of write requests pending for the target destination, and further synchronizes the runtime processing speed of the at least two out of sync operators based on the number of pending write requests for the target destination.

13. The computing system of claim 8, wherein the processor determines a current load of the target destination, and further synchronizes the runtime processing speed of the at least two out of sync operators based on the current load of the target destination.

14. The computing system of claim 8, wherein the processor determines a current speed of a target table within the target destination, and further synchronizes the runtime processing speed of the at least two out of sync operators based on the current speed of the target table.

15. A non-transitory computer readable medium having stored therein instructions that when executed cause a computer to perform a method comprising:

executing a stream processing application which reads data from a data source and writes the data to a target destination, the stream processing application comprising a pipeline of operators which perform different processing operations on the data;

determining that a runtime processing speed of at least two operators among the pipeline of operators included in the stream processing application are out of sync with respect to each other;

determining an average speed of the data stream processing application processing a write request from the data source to the target destination; and dynamically synchronizing the runtime processing speed of the at least two out of sync operators in the pipeline of operators of the stream processing application by changing a processing speed of at least one operator based on an overall processing performance of the stream processing application as a whole, wherein the dynamically synchronizing comprises, in response to the average speed exceeding a predetermined upper limit, slowing down the processing speed of the at least one operator, and in response to the average speed being below a predetermined lower limit, speeding up the processing speed of the at least one operator.

* * * * *